United States Patent
Jaradi et al.

(10) Patent No.: US 11,325,556 B2
(45) Date of Patent: May 10, 2022

(54) VEHICLE AIRBAG

(71) Applicant: Ford Global Technologies, LLC, Dearborn, MI (US)

(72) Inventors: Dean M. Jaradi, Macomb, MI (US); S. M. Iskander Farooq, Novi, MI (US); Mohammad Omar Faruque, Ann Arbor, MI (US); Zhenyan Gao, Northville, MI (US)

(73) Assignee: FORD GLOBAL TECHNOLOGIES, LLC

( * ) Notice: Subject to any disclaimer, the term of this patent is extended or adjusted under 35 U.S.C. 154(b) by 0 days.

(21) Appl. No.: 17/020,870

(22) Filed: Sep. 15, 2020

(65) Prior Publication Data

US 2022/0080921 A1 Mar. 17, 2022

(51) Int. Cl.
| | |
|---|---|
| *B60R 21/232* | (2011.01) |
| *B60R 21/205* | (2011.01) |
| *B60R 21/231* | (2011.01) |
| *B60N 2/14* | (2006.01) |

(52) U.S. Cl.
CPC .......... *B60R 21/232* (2013.01); *B60R 21/205* (2013.01); *B60R 21/23138* (2013.01); *B60N 2/143* (2013.01); *B60R 2021/23192* (2013.01)

(58) Field of Classification Search
None
See application file for complete search history.

(56) References Cited

U.S. PATENT DOCUMENTS

| | | | |
|---|---|---|---|
| 9,108,584 B2 | 8/2015 | Rao et al. | |
| 9,902,362 B2 | 2/2018 | Farooq et al. | |
| 9,963,035 B2 | 5/2018 | El Aile et al. | |
| 10,144,381 B2 | 12/2018 | Faruque et al. | |
| 10,207,697 B2 | 2/2019 | Brown et al. | |
| 10,252,693 B2 | 4/2019 | Numazawa | |
| 10,640,075 B2 * | 5/2020 | Chen | B60R 21/214 |
| 10,882,487 B2 * | 1/2021 | White | B60N 2/14 |
| 2011/0079988 A1 | 4/2011 | Bauer et al. | |
| 2013/0087995 A1 | 4/2013 | Lee et al. | |
| 2017/0267204 A1 | 2/2017 | Farooq et al. | |
| 2018/0126941 A1 | 5/2018 | Faruque et al. | |
| 2018/0297550 A1 | 10/2018 | Kitagawa | |
| 2018/0345895 A1 | 12/2018 | Farooq et al. | |
| 2018/0370472 A1 | 12/2018 | Belwafa et al. | |
| 2019/0023213 A1 | 1/2019 | Faruque et al. | |
| 2019/0054888 A1 | 2/2019 | Fukawatase et al. | |
| 2019/0111880 A1 * | 4/2019 | Choi | B60R 21/2338 |

(Continued)

FOREIGN PATENT DOCUMENTS

| | | | | |
|---|---|---|---|---|
| DE | 19818121 A1 | 5/1999 | | |
| DE | 102015121092 A1 * | 6/2016 | ........... | B60R 21/216 |

(Continued)

*Primary Examiner* — Faye M Fleming
(74) *Attorney, Agent, or Firm* — Frank A. MacKenzie; Bejin Bieneman PLC

(57) ABSTRACT

A vehicle includes a bulkhead. The vehicle includes an airbag supported by the bulkhead and inflatable to an inflated position. The airbag in the inflated position includes a main chamber and a pair of side chambers that extend transversely from the main chamber. The vehicle includes a seat having a seatback and a seat bottom that extends from the seatback in a direction away from the bulkhead. The seatback is between the side chambers in the inflated position.

20 Claims, 7 Drawing Sheets

(56) References Cited

U.S. PATENT DOCUMENTS

| | | | | |
|---|---|---|---|---|
| 2019/0118758 A1* | 4/2019 | Arima | ................... | B60R 21/205 |
| 2019/0217804 A1* | 7/2019 | Cho | ..................... | B60R 21/214 |
| 2019/0315304 A1* | 10/2019 | Chen | .................. | B60R 21/2338 |
| 2020/0122676 A1* | 4/2020 | Sekizuka | ........... | B60N 2/42745 |
| 2020/0317153 A1* | 10/2020 | Shen | ....................... | B60R 21/26 |

FOREIGN PATENT DOCUMENTS

| | | | | | |
|---|---|---|---|---|---|
| DE | 102016216329 A1 | | 3/2018 | | |
| EP | 1634778 A1 | * | 3/2006 | ......... | B60N 2/42709 |
| JP | 2020062960 A | * | 4/2020 | ........... | B60R 21/233 |

* cited by examiner

VEHICLE AIRBAG

BACKGROUND

A vehicle may include one or more airbags deployable during a vehicle impact to control kinematics of occupants inside the vehicle during the impact. The airbag may be a component of an airbag assembly including a housing supporting the airbag, and an inflation device in communication with the airbag for inflating the airbag from an uninflated position to an inflated position.

DETAILED DESCRIPTION

Figure 1:
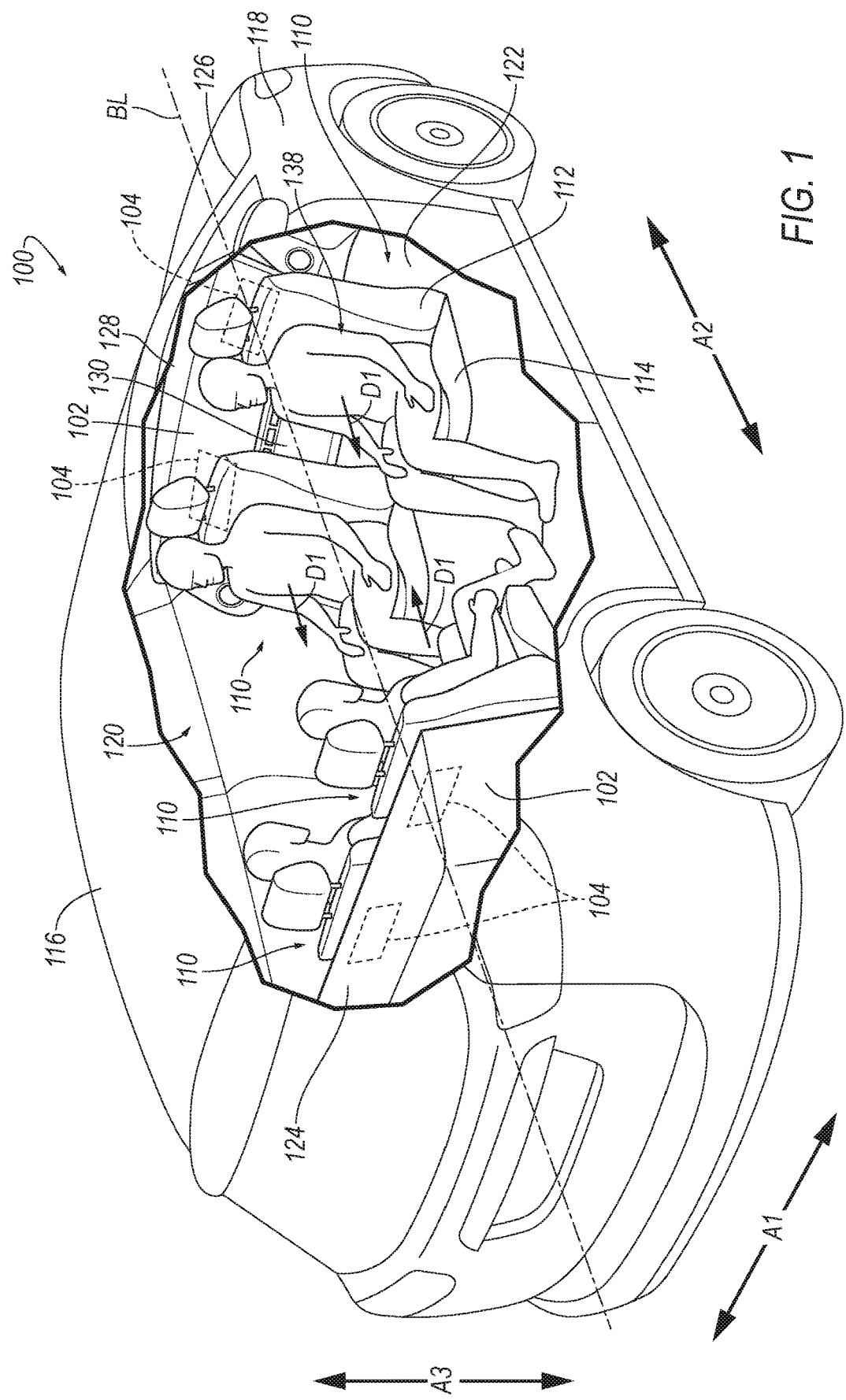
FIG. 1 is a perspective view of a vehicle broken away to show a passenger cabin.
Figure 2:
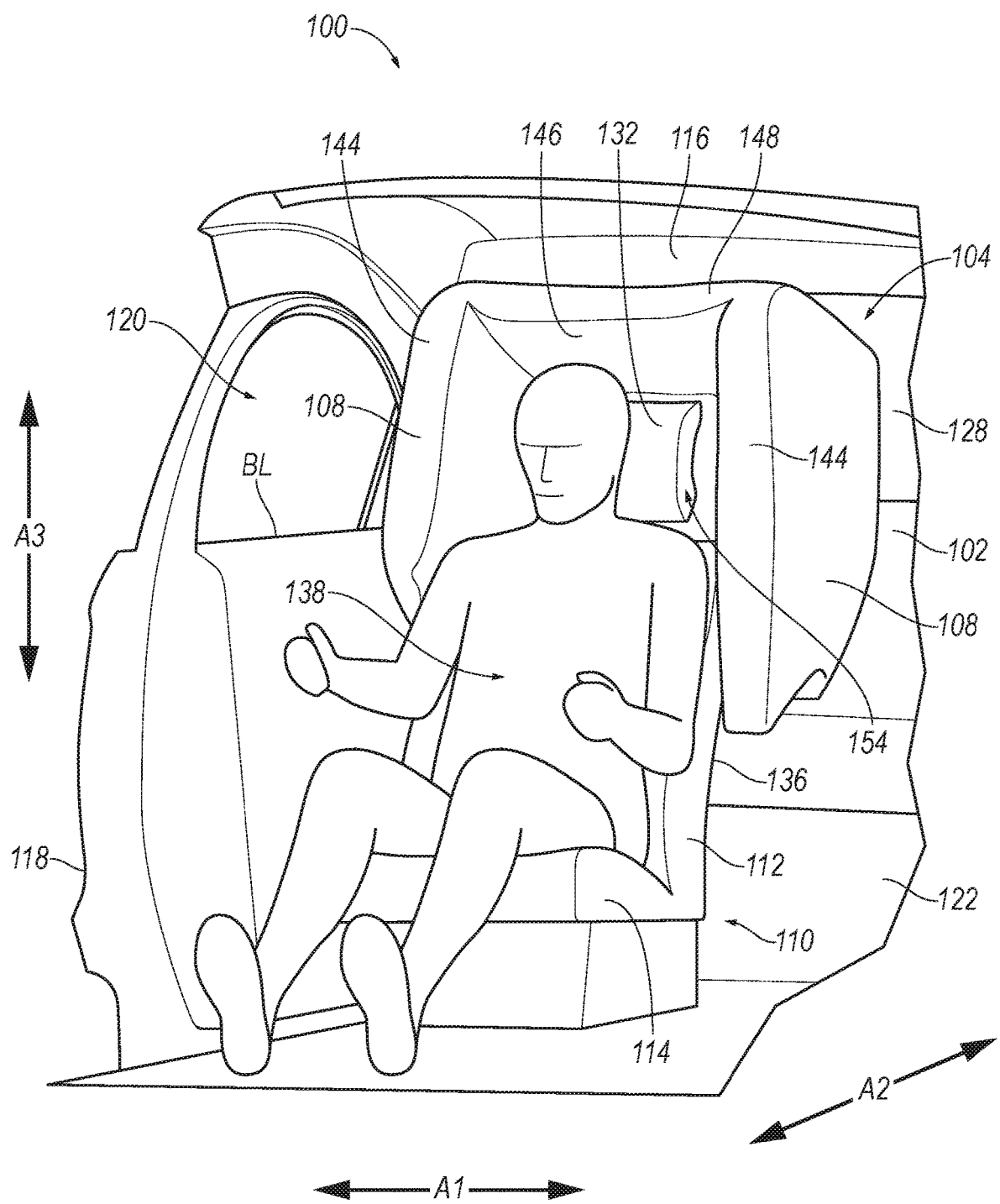
FIG. 2 is a perspective view of a seat of the vehicle facing away from a bulkhead with an airbag in an inflated position.
Figure 3:
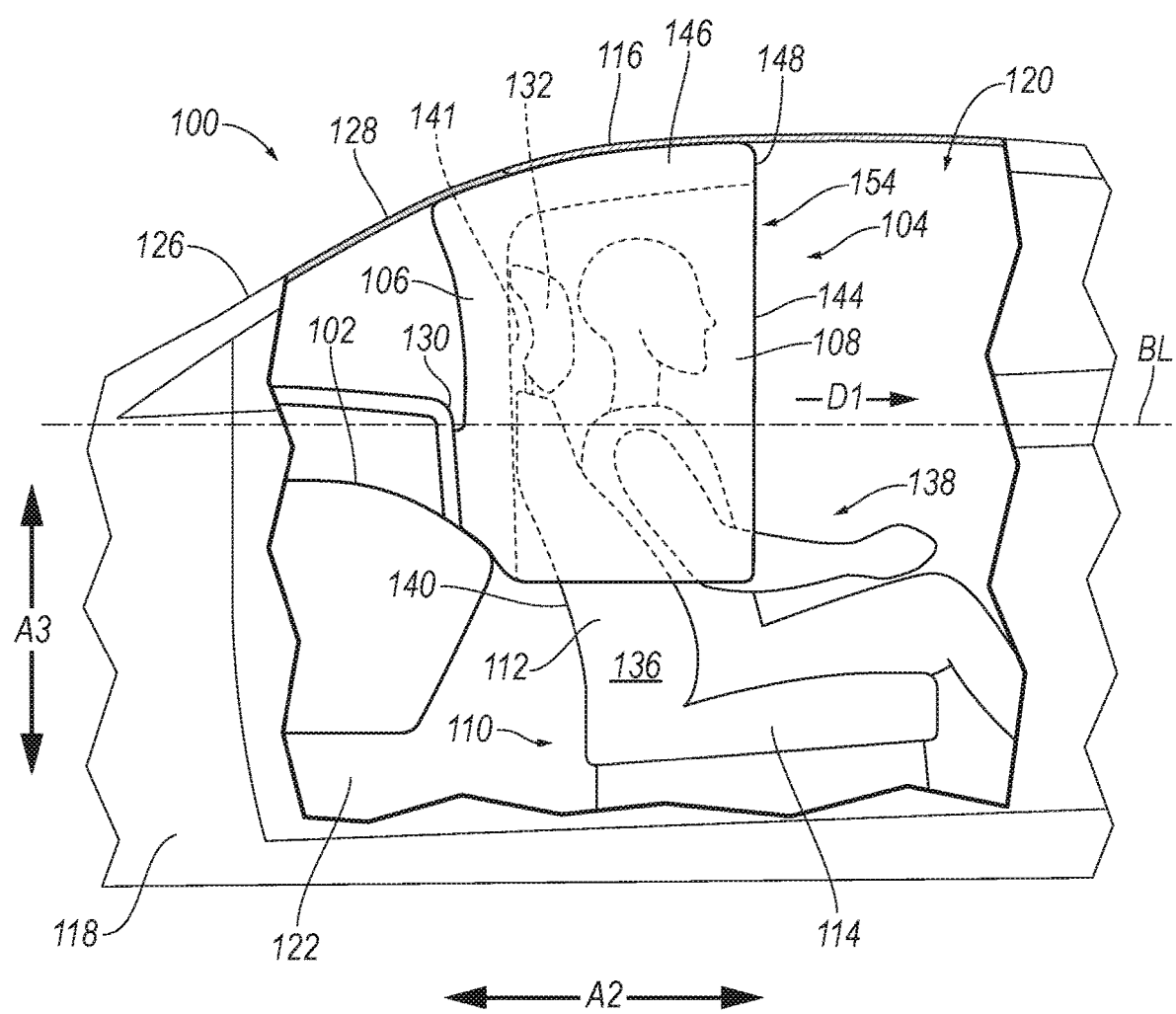
FIG. 3 is a side view of the seat facing away from the bulkhead with airbag in the inflated position.
Figure 4:
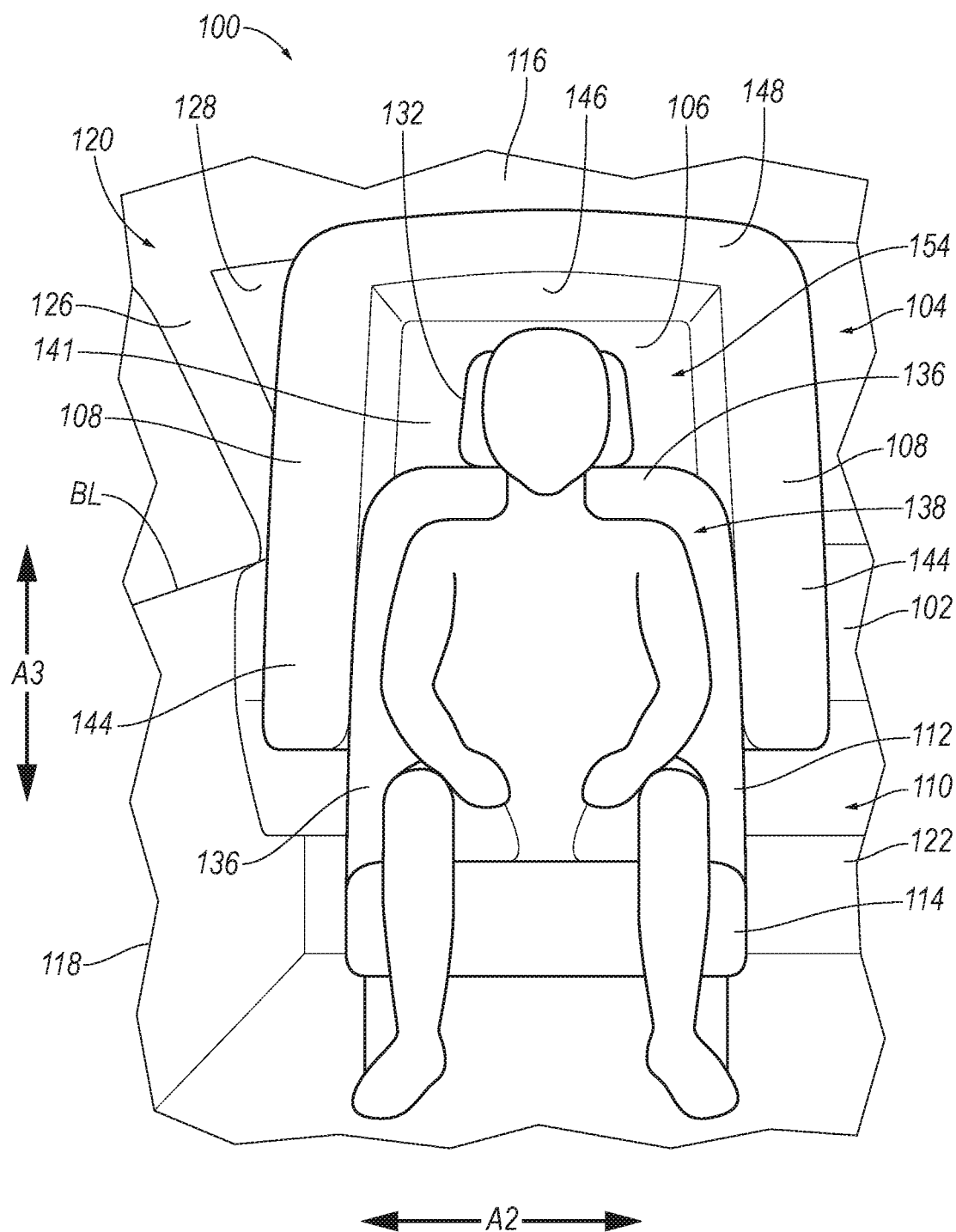
FIG. 4 is a front view of the seat facing away from the bulkhead with airbag in the inflated position.

A vehicle includes a bulkhead. The vehicle includes an airbag supported by the bulkhead and inflatable to an inflated position. The airbag in the inflated position includes a main chamber and a pair of side chambers that extend transversely from the main chamber. The vehicle includes a seat having a seatback and a seat bottom that extends from the seatback in a direction away from the bulkhead. The seatback is between the side chambers in the inflated position.

The vehicle may include a passenger cabin, and the bulkhead may be at a front of the passenger cabin.

The vehicle may include a passenger cabin, and the bulkhead may be at a rear of the passenger cabin.

The bulkhead may include an instrument panel.

The main chamber may include a protrusion extending away from the bulkhead between the side chambers.

The seatback may include a rear surface that faces the bulkhead, the airbag may abut the rear surface in the inflated position.

The airbag in the inflated position may include a top chamber that extends from the main chamber away from the bulkhead and along the side chambers.

The side chambers may extend downward from the top chamber and beyond a beltline of the vehicle.

The main chamber, the side chambers, and the top chamber may collectively define a pocket, the seatback in the pocket.

The pocket may be open in a seat-forward direction.

The seatback may be beneath the top chamber.

The main chamber may include a protrusion extending away from the bulkhead between the side chambers, the protrusion spaced from the top chamber.

The seatback may be narrower along a cross-vehicle axis than a spacing between the side chambers.

The vehicle may include a windshield, and the airbag in the inflated position may abut the windshield.

The seat may include a head restraint, and the airbag in the inflated position may abut the head restraint.

The vehicle may include a roof, and the airbag in the inflated position may extend from the windshield and along the roof above the head restraint.

The airbag may extend from above the head restraint to below a vertical midpoint of the seatback.

The seatback may be spaced from the bulkhead along a vehicle-longitudinal axis.

The vehicle may include an A-pillar, and the airbag in the inflated position may be between the A-pillar and the seatback.

The seat may define an occupant seating area, the seatback may be between the bulkhead and the occupant seating area.

With reference to the figures, wherein like numerals identify like features, a vehicle 100 includes a bulkhead 102. The vehicle 100 includes an airbag 104 supported by the bulkhead 102 and inflatable to an inflated position. The airbag 104 in the inflated position includes a main chamber 106 and a pair of side chambers 108 that extend transversely from the main chamber 106. The vehicle 100 includes a seat 110 having a seatback 112 and a seat bottom 114. The seat bottom 114 extends from the seatback 112 in a direction away from the bulkhead 102, and the seatback 112 is between the side chambers 108 in the inflated position, e.g., when a facing direction of the seat 110 is away from the bulkhead 102. The facing direction of the seat 110 is generally the direction in which an occupant seated in the seat 110 faces. The seat bottom 114 extends from the seatback 112 in the facing direction of the seat 110.

The airbag 104 in the inflated position may control kinematics of the seat 110 and an occupant of the seat 110, e.g., during an impact to the vehicle 100. For example, the main chamber 106 of the airbag 104 my control kinematics of occupant and/or the seatback 112 toward the bulkhead 102. As another example the side chambers 108 of the airbag 104 may control movement of the occupant relative to the seat 110 along a cross-vehicle axis A1.

The vehicle 100 may be any suitable type of automobile, e.g., a passenger or commercial automobile such as a sedan, a coupe, a truck, a sport utility vehicle, a crossover vehicle, a van, a minivan, a taxi, a bus, etc. The vehicle 100, for example, may be an autonomous vehicle. In other words, the vehicle 100 may be autonomously operated such that the vehicle 100 may be driven without constant attention from a driver, i.e., the vehicle 100 may be self-driving without human input.

The vehicle 100 defines a longitudinal axis A2, i.e., extending between a front and a rear of the vehicle 100. The vehicle 100 defines a cross-vehicle axis A1, i.e., extending between a right side and a left side of the vehicle 100. The vehicle 100 defines a vertical axis A3, i.e., extending between a top, e.g., a roof 116, and a bottom, e.g., a floor, of the vehicle 100. The longitudinal axis A2, the cross-vehicle axis A1, and the vertical axis A3 are perpendicular to each other.

The vehicle 100 may include a body 118. The body 118 includes body panels partially defining an exterior of the vehicle 100. The body panels may present a class-A surface, i.e., a finished surface exposed to view by a customer and free of unaesthetic blemishes and defects. The body panels include, e.g., a roof 116, etc.

The vehicle 100 may define a beltline BL. The beltline BL extends along a bottom edge of one or more windows of the vehicle 100. In other words, the beltline BL may be where the windows meet the body panels that are below the windows. The beltline BL may be generally horizontal. Vertically, the beltline BL may be generally at a mid-point of the vehicle 100, i.e., generally at mid-height of the vehicle 100.

The body 118 may define a passenger cabin 120 to house occupants, if any, of the vehicle 100. The passenger cabin 120 may extend across the vehicle 100, i.e., from one side to the other side of the vehicle 100. The passenger cabin 120 includes a front end 122 and a rear end 124 with the front end 122 being in front of the rear end 124 during forward movement of the vehicle 100.

The body 118 may include the roof 116. The roof 116 of the vehicle 100 extends above and covers the passenger cabin 120, e.g., providing cover for occupants of the passenger cabin 120. The roof 116 may include cross-beams, an exterior panel, and a headliner. The cross-beams support the exterior panel, the headliner, etc. The cross-beams may be steel, aluminum, carbon fiber, or any other suitable material. The cross-beams may be elongated along the vehicle-lateral axis. The headliner and the exterior panel provide class-A surfaces to the roof 116, i.e., surfaces specifically manufactured to have a high-quality, finished aesthetic appearance free of blemishes, etc.

The body may include pillars. The pillars support the roof 116. For example, the 100 118 may include an A-pillar 126 and a B-pillar on each side of the vehicle 100. The A-pillars 126 may be between the windshield 128 and the front doors. In other words, the A-pillars 126 may be disposed at the front end 122 of the passenger cabin 120 with a windshield 128 therebetween. The B-pillars may be behind the front doors, e.g., between adjacent doors. In other words, the B-pillars may be spaced from the A-pillars 126 by a front door opening. The vehicle 100 may include additional pillars, e.g., C-pillars, D-pillars. The pillars may extend from the roof 116 to the floor.

The windshield 128 is disposed at the front end 122 of the passenger cabin 120. The windshield 128 may extend from one side of the vehicle 100 to the other side of the vehicle 100. The windshield 128 may extend from the bulkhead 102 to the roof 116. The windshield 128 may face in a forward direction from the passenger cabin 120. The windshield 128 may be any suitably transparent material, including glass such as laminated, tempered glass or plastic. Another windshield may be disposed at the rear end 124 if the passenger cabin.

As set forth above, the vehicle 100 includes one or more bulkheads 102. In the example shown in the Figures, the vehicle 100 includes two bulkheads with one bulkhead 102 at the front end 122 of the passenger cabin 120 and one bulkhead 102 at the rear end 124 of the passenger cabin 120. In such an example, the bulkheads 102 may be identical or different. As other examples, the vehicle 100 may include only one bulkhead 102, i.e., one at the front end 122 or one at the rear end 124. The bulkheads 102 of the vehicle 100 may extend from the pillar on a right side of the vehicle 100 to the pillar on a left side of the vehicle 100. In other words, the bulkheads 102 may extend completely across the passenger cabin 120 along the cross-vehicle axis A1. The bulkheads 102 may each extend from a floor of the passenger cabin 120 to the respective front or rear windshield 128, e.g., relative to the vertical axis A3 of the vehicle 100. The bulkheads 102 may each include an instrument panel 130. The instrument panel 130 includes one or more instruments such as gauges, displays, a user interface, etc. The instrument panel 130 may be elongated along the cross-vehicle axis A1 from the left side of the vehicle 100 to the right side of the vehicle 100. The instrument panel 130 presents information to and may receive information from an occupant of the vehicle 100. The instrument panel 130 may include dials, digital readouts, screens such as a touch-sensitive display screen, speakers, buttons, knobs, keypads, microphone, and so on for providing information to, and receiving information from, the occupant. The instrument panel 130 may support vehicle controls, including a steering wheel.

The seat 110 may be supported in the passenger cabin 120, e.g., the floor. The seats may be arranged in the passenger cabin 120 in any suitable position, i.e., as a front seat, a rear seat, a third-row seat, etc. The seat 110 may be movable relative to the floor to various positions, e.g., movable fore-and-aft and/or cross-vehicle. The seat 110 may be of any suitable type, e.g., a bucket seat, a bench seat, etc. The seat 110 assembly may rotate about the vertical axis A3 that extends through the roof 116 and the floor. For example, the seat 110 may rotate between a vehicle-forward-facing position, a vehicle-rearward-facing position, a vehicle-rightward-facing position, a vehicle-leftward-facing position, and/or positions therebetween. In the vehicle-forward-facing position, the occupant of the seat 110 faces the front end 122 of the passenger cabin 120. In the vehicle-rearward-facing position the occupant of the seat 110 faces the rear end 124 of the passenger cabin 120. The seat 110 may rotate completely, i.e., 360°, about the vertical axis A3. The seat 110 may rotate between fixed positions, e.g., the forward-facing position and the rearward-facing position, or may be rotatable to an infinite number of positions.

The seatback 112 may be supported by the seat bottom 114 and may be stationary or movable relative to the seat bottom 114. The seatback 112 and the seat bottom 114 may be adjustable in multiple degrees of freedom. Specifically, the seatback 112 and the seat bottom 114 may themselves be adjustable, in other words, adjustable components within the seatback 112 and/or the seat bottom 114, and/or may be adjustable relative to each other. The seatback 112 of the seat 110 may be spaced from the bulkhead 102 along the longitudinal axis A2, e.g., closer to the bulkhead 102 at front of the passenger cabin 120 than to the bulkhead 102 at the rear of the passenger cabin 120. The seat bottom 114 extends from the seatback 112 and away from the bulkhead 102, e.g., toward a center of the passenger cabin 120 along the longitudinal axis A2 when the seat 110 is facing away from the bulkhead 102.

The seat 110 may include a head restraint 132. The head restraint 132 may be supported by the seatback 112, e.g., at a top of the seatback 112 opposite the seat bottom 114. The head restraint 132 may be stationary or movable relative to the seatback 112.

The seatback 112 may include a seatback frame and a covering 136 supported on the seatback frame. The seatback frame may include tubes, beams, etc. The seatback frame may be of any suitable plastic material, e.g., carbon fiber reinforced plastic (CFRP), glass fiber-reinforced semi-finished thermoplastic composite (organosheet), etc. As another example, some or all components of the seatback frame may be formed of a suitable metal, e.g., steel, aluminum, etc. The covering 136 may include upholstery and padding. The upholstery may be cloth, leather, faux leather, or any other suitable material. The upholstery may be stitched in panels around the frame. The padding may be between the covering 136 and the seatback frame and may be foam or any other suitable material.

The seat 110 defines an occupant seating area 138. The occupant may be disposed in the occupant seating area 138, as shown in the Figures. The occupant seating area 138 may be on a front side of the seatback 112 and on top of the seat bottom 114. The seatback 112 may be between the bulkhead 102 and the occupant seating area 138, e.g., along the longitudinal axis A2 when the seat 110 is facing way from the bulkhead 102.

The seatback 112 can include a rear surface 140. The rear surface 140 may be at an outside of the covering 136 of the setback, i.e., opposite the seatback frame. For example, the rear surface 140 may be an exterior class-A surface. The rear surface 140 may face away from the seat bottom 114. For example, the seat bottom 114 may extend from the seatback 112 in a seat-forward direction D1 and the rear surface 140 of the seatback 112 may face in a seat-rearward direction. The rear surface 140 may face the bulkhead 102, e.g., a line extending normally from the rear surface 140 may be toward the bulkhead 102 closest to the seat 110, e.g., along the longitudinal axis A2 when the seat 110 is facing way from the bulkhead 102. In such an example, the seatback 112 is between the airbag 104 and the occupant seating area 138.

Airbags 104 are supported behind the seats 100 relative to the seat-forward direction and when the seats 100 face away from the bulkheads 102. One airbag 104 may be supported by the respective bulkhead 102 behind each seat 110. In other words, each airbag 104 may be supported relative to, and control kinematics of, a respective one of the seats 100.

An airbag assembly may include a housing, an inflator 156, and the airbag 104. The inflator 156 and the airbag 104 in the uninflated position may be disposed in the housing. The housing provides a reaction surface for the airbag 104 in the inflated position. The housing may be supported by, e.g., fixed to, the bulkhead 102. The housing may be formed of any suitable material, e.g., a rigid polymer, a metal, a composite, etc.

Each airbag 104 is inflatable from an uninflated position. shown in FIG. 1, to the inflated position, shown in FIGS. 2-6. The airbag 104 may be woven nylon yarn, for example, nylon 6, 6. Other examples include polyether ether ketone (PEEK), polyetherketoneketone (PEKK), polyester, etc. The woven polymer may include a coating, such as silicone, neoprene, urethane, etc. For example, the coating may be polyorgano siloxane.

The main chamber 106 of the airbag 104 in the inflated position is between the seatback 112 and the bulkhead 102 supporting the airbag 104. The main chamber 106 may abut the rear surface 140 of the seatback 112 and the bulkhead 102 supporting the airbag 104. The main chamber 106 may be wider than the seatback 112 along the cross-vehicle axis A1. The main chamber 106 may be centered relative to the seatback 112 along the cross-vehicle axis A1. The main chamber 106 may extend from below the beltline BL to above the seatback 112, e.g., above the head restraint 132 and along the vertical axis A3.

Figure 5:
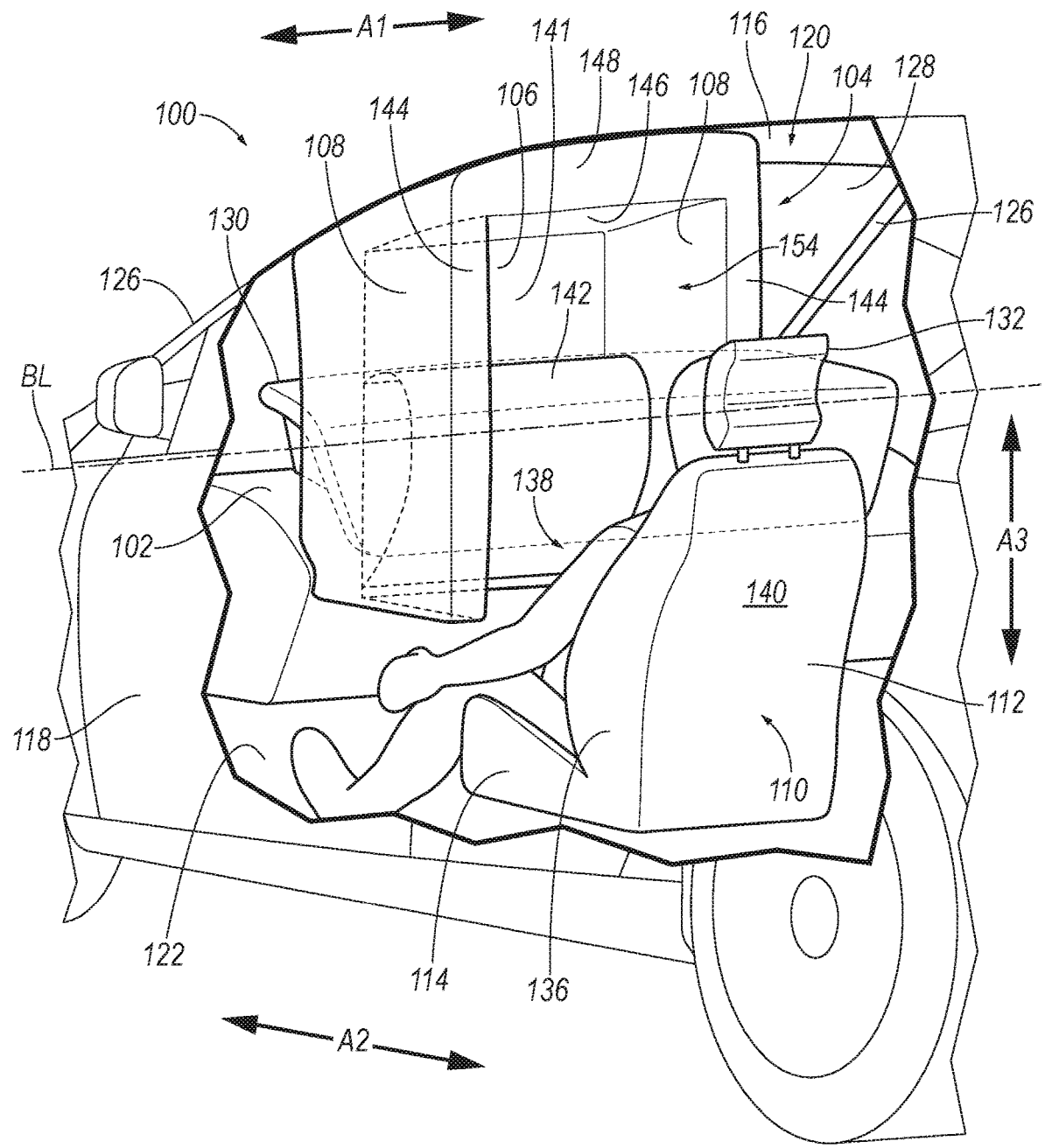
FIG. 5 is a perspective view of the seat of the vehicle facing toward the bulkhead with the airbag in an inflated position.
Figure 6:
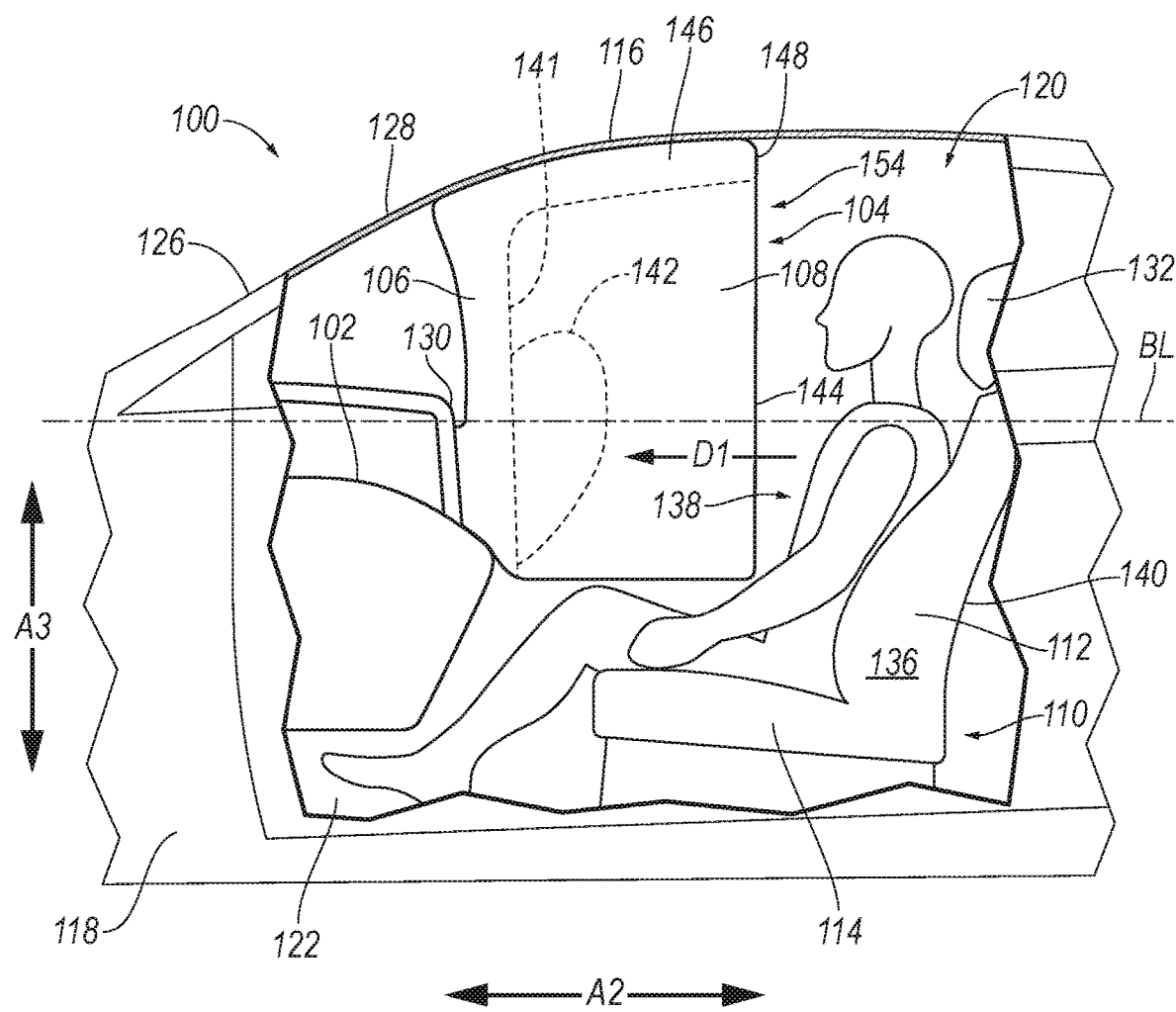
FIG. 6 is a side view of the seat of the vehicle facing toward the bulkhead with the airbag in an inflated position.
Figure 7:
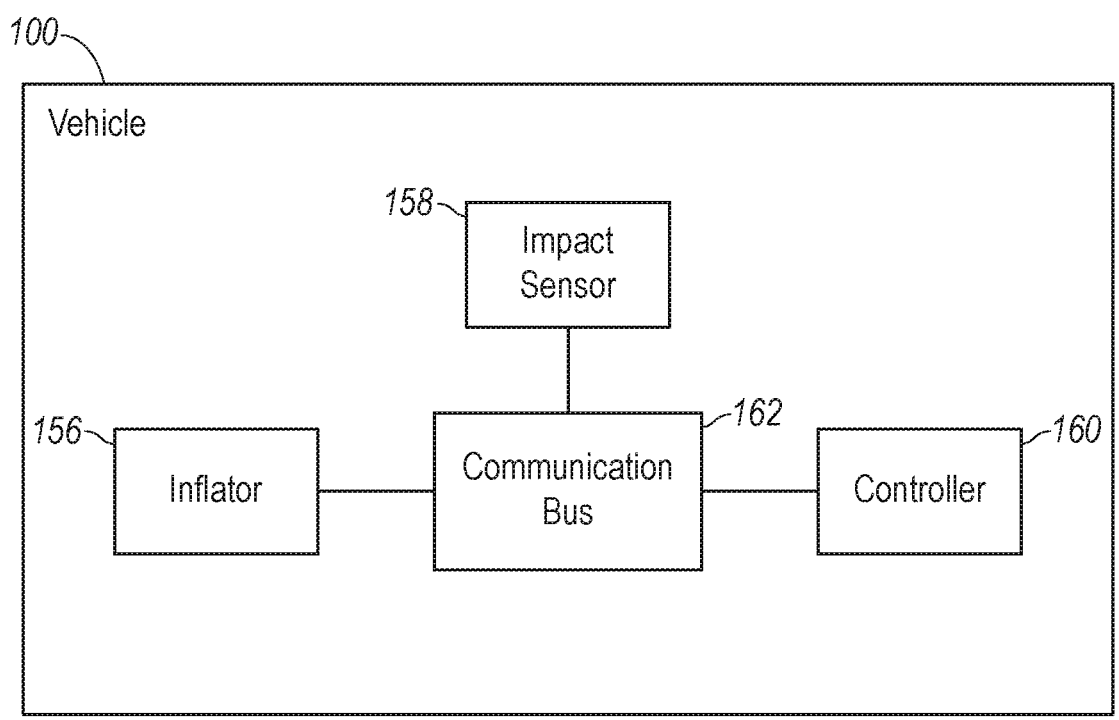
FIG. 7 is a block diagram of components of the vehicle.

The main chamber 106 includes a protrusion 142, shown in FIGS. 5 and 6, extending from a main panel 141 of the main chamber 106 between the side chambers 108 and away from the bulkhead 102. The protrusion 142 may control kinematics of the occupant of the seat 110, e.g. during an impact to the vehicle 100 when the seat 110 is facing the bulkhead 102. The protrusion 142 may be elongated along the cross-vehicle axis A1. The protrusion 142 may extend from one side camber 108 to the other side chamber 108. The protrusion 142 may, for example, define a tear drop shape in cross section and extend away from the main panel 141 and between opposing distal ends at each of the side chambers 108. The protrusion 142 may be generally vertically aligned with a top of the seatback 112, e.g., with a head and upper torso of the occupant of the seat 110. The seatback 112 may inhibit the protrusion 142 from inflating when the seat 110 is facing away from the bulkhead 102 (note the lack of inflation of the protrusion 142 in FIG. 3). For example, the main panel 141 may abut the seatback 112 when the seat 110 is facing away from the bulkhead 102, with the seatback 112 of the seat 110 facing away from the bulkhead 102 occupying a volume in which the protrusion 142 would typically inflate to occupy when the seat 110 faces toward the bulkhead 102. When the seat 110 is facing the bulkhead 102, the protrusion 142 inflates from the main panel toward the seatback 112, as shown in FIGS. 5 and 6.

The pair of side chambers 108 are at the sides of the main chamber 106, e.g., spaced from each other along the cross-vehicle axis A1 with one of the side chambers 108 at the right side and another of the side chambers 108 at the left side of the main chamber 106. The side chambers 108 of the airbag 104 in the inflated position extend transversely from the main chamber 106 to front edges 144 in front of the seatback 112. For example, the side chambers 108 may extend perpendicular from the main chamber 106 away from the bulkhead 102 supporting the airbag 104. The side chambers 108 extend from behind the seatback 112 along the longitudinal axis A2. For example, the side chambers 108 may extend from the main chamber 106 in the seat-forward direction D1, e.g., away from the bulkhead 102 when the seat 110 is facing way from the bulkhead 102.

The airbag 104 in the inflated position can include a top chamber 146. The top chamber 146 may at a top of the main chamber 106. The top chamber 146 may extend from the main chamber 106, e.g., away from the bulkhead 102, in the seat-forward direction D1, etc., to a front edge 148 in front of the seatback 112. The top chamber 146 may extend along the side chambers 108, e.g., at a top of the side chambers 108 and along the longitudinal axis A2. For example, side edges of the top chamber 146 may be fixed to top edges of the side chambers 108. The protrusion 142 of the main chamber 106 may be spaced from top chamber 146, e.g., along the vertical axis A3.

The main chamber 106, the side chambers 108 and the top chamber 146 may collectively define a pocket 154. For example, a back of the pocket 154 may be defined by the main chamber 106, right and left sides of the pocket 154 may be defined by the pair of side chambers 180, and a top of the pocket 154 may be defined by the top panel. The pocket 154 may open in the seat-forward direction D1. For example, the pocket 154 may be open between the front edges 144 of the side cambers and below the front edge 148 of the top chamber 146.

The seatback 112 and the head restraint 132 may be beneath the top chamber 146, e.g., in the pocket 154. For example, the seatback 112 and the head restraint 132 may be between the side chambers 108, e.g., along the cross-vehicle axis A1. The seatback 112 and the head restraint 132 may narrower along the cross vehicle 100 axis than a spacing between the side chambers 108. The seatback 112 and the head restraint 132 may be between the main chamber 106 and the front edges 144 of the side chambers 108 and the front edge 148 of the top panel along the vehicle 100-longitudinal axis A2.

The airbag 104 in the inflated may abut the windshield 128. For example, the main chamber 106 and/or the top chamber 146 may abut the windshield 128 above the bulkhead 102 supporting the airbag 104. The airbag 104 in the inflated position extends from the windshield 128 and along the roof 116, e.g., along the vehicle 100-longitudinal axis A2. The airbag 104 in the inflated position may extend along the roof 116 above the head restraint 132. For example, the top chamber 146 may be between the roof 116 and the head restraint 132 along the vertical axis A3. The airbag 104 in the inflated position may abut the roof 116 and/or the head restraint 132. For example, the top chamber 146 may be compressed between the roof 116 and the head restraint 132.

The airbag 104 may extend from above the head restraint 132 to below a vertical midpoint of the seatback 112 and/or below the beltline BL. For example, side chambers 108 and the main chamber 106 may extend downward from the top chamber 146 toward the floor and beyond the vertical midpoint of the seatback 112 and the beltline BL of the vehicle 100. As another example, bottom edges of the main chamber 106 and side chambers 108 may be between the floor of the vehicle 100 and the beltline BL and/or vertical midpoint of the seatback 112 along the vertical axis A3. The vertical midpoint is generally halfway between the top of the seatback 112, e.g., at the head restraint 132, and the seat bottom 114.

The airbag 104 in the inflated position may be between the A-pillar 126 and the seatback 112. For example, the main chamber 106 and/or the side chambers 108 may be between the seatback 112 and the A-pillar 126 along the cross-vehicle axis A1. The airbag 104 between the seatback 112 and the A-pillar 126 may control kinematics of the seat 110 and/or the occupant relative to the A-pillar 126.

With reference to FIG. 6, the inflator 156 is included for inflating the airbag 104 to the inflated position with an inflatable medium, such as a gas. The inflator 156 may be supported by the bulkhead 102, e.g., fixed to the housing supporting the airbag 104, or at any suitable location on the vehicle 100. The inflator 156 is in fluid communication with the airbag 104, e.g., such that inflation medium from the inflator 156 may flow to the middle chamber, the side chambers 108, and the top chamber 146. The inflator 156 may be, for example, a pyrotechnic inflator that uses a chemical reaction to drive inflation medium to the airbag 104. The inflator 156 may be of any suitable type, for example, a cold-gas inflator.

The vehicle 100 may include an impact sensor 158 programmed to detect an impact to the vehicle 100. The impact sensor 158 may be of any suitable type, for example, post-contact sensors such as accelerometers, pressure sensors, and contact switches; and pre-impact sensors such as radar, LIDAR, and vision-sensing systems. The vision systems may include one or more cameras, CCD image sensors, CMOS image sensors, etc. The impact sensor 158 may be located at numerous points in or on the vehicle 100.

The vehicle 100 may include a controller 160 for controlling actuation of the inflator 156. The controller 160 may be a microprocessor-based controller implemented via circuits, chips, or other electronic components. For example, the controller 160 may include a processor, memory, etc. The memory of the controller 160 may include memory for storing instructions executable by the processor for performing the functions described herein, as well as for electronically storing data and/or databases.

The controller 160, the impact sensor 158, and the inflator 156 may be connected to a communication bus 162, such as a controller 160 area network (CAN) bus, of the vehicle 100. The controller 160 may use information from the communication bus 162 to control the activation of the inflator 156. The inflator 156 may be connected to the controller 160 via the communication bus 162 as shown in FIG. 6, or the inflator 156 may be may be connected directly to the controller 160 (now shown).

In operation under normal operating conditions of the vehicle 100, the airbag 104 is in the uninflated position. In the event of an impact, the impact sensor 158 may detect the impact and transmit a signal through the communication bus 162 to the controller 160, and the controller 160 may transmit a signal through the communication bus 162 to the inflator 156. In response to receiving such signal, the inflator 156 may discharge and inflate the airbag 104 to the inflated position to control kinematics of the seat 110 and/or the occupant.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A vehicle, comprising:
a bulkhead;
an airbag supported by the bulkhead and inflatable to an inflated position, the airbag in the inflated position including a main chamber and a pair of side chambers that extend transversely from the main chamber; and
a seat having a seatback and a seat bottom that extends from the seatback in a direction away from the bulkhead, the seatback adjustable in at least one degree of freedom relative to the seat bottom, the seatback between the side chambers in the inflated position.

2. The vehicle of claim 1, further comprising a passenger cabin, and wherein the bulkhead is at a front of the passenger cabin.

3. The vehicle of claim 1, wherein the bulkhead includes an instrument panel.

4. The vehicle of claim 1, wherein the main chamber includes a protrusion extending away from the bulkhead between the side chambers.

5. The vehicle of claim 1, wherein the seatback includes a rear surface that faces the bulkhead, the airbag abutting the rear surface in the inflated position.

6. The vehicle of claim 1, wherein the airbag in the inflated position includes a top chamber that extends from the main chamber away from the bulkhead and along the side chambers.

7. The vehicle of claim 6, wherein the main chamber, the side chambers, and the top chamber collectively define a pocket, the seatback being in the pocket.

8. The vehicle of claim 7, wherein the pocket is open in a seat-forward direction.

9. The vehicle of claim 6, wherein the seatback is beneath the top chamber.

10. The vehicle of claim 6, wherein the main chamber includes a protrusion extending away from the bulkhead between the side chambers, the protrusion spaced from the top chamber.

11. The vehicle of claim 1, wherein the seatback is narrower along a cross-vehicle axis than a spacing between the side chambers.

12. The vehicle of claim 1, further comprising a windshield, and wherein the airbag in the inflated position abuts the windshield.

13. The vehicle of claim 12, wherein the seat includes a head restraint supported by and movable relative to the seatback, and wherein the airbag in the inflated position abuts the head restraint.

14. The vehicle of claim 13, further comprising a roof, and wherein the airbag in the inflated position extends from the windshield and along the roof above the head restraint.

15. The vehicle of claim 14, wherein the airbag extends from above the head restraint to below a vertical midpoint of the seatback.

16. The vehicle of claim 1, wherein the seatback is spaced from the bulkhead along a vehicle-longitudinal axis.

17. The vehicle of claim 1, further comprising an A-pillar, and wherein the airbag in the inflated position is between the A-pillar and the seatback.

18. The vehicle of claim 1, wherein the seat defines an occupant seating area, the seatback between the bulkhead and the occupant seating area.

19. A vehicle, comprising:

a passenger cabin;

a bulkhead at a rear of the passenger cabin;

an airbag supported by the bulkhead and inflatable to an inflated position, the airbag in the inflated position including a main chamber and a pair of side chambers that extend transversely from the main chamber; and a seat having a seatback and a seat bottom that extends from the seatback in a direction away from the bulkhead, the seatback between the side chambers in the inflated position.

20. A vehicle, comprising:

a bulkhead;

an airbag supported by the bulkhead and inflatable to an inflated position, the airbag in the inflated position including a main chamber and a pair of side chambers that extend transversely from the main chamber, the airbag in the inflated position including a top chamber that extends from the main chamber away from the bulkhead and along the side chambers, the side chambers extend downward from the top chamber and beyond a beltline of the vehicle; and a seat having a seatback and a seat bottom that extends from the seatback in a direction away from the bulkhead, the seatback between the side chambers in the inflated position.

* * * * *